3,773,925
PARTRICIN

Tiberio Bruzzese and Rodulfo Ferrari, Milan, Italy, assignors to SPA-Societá Prodotti Antibiotici S.p.A., Milan, Italy
Filed Nov. 3, 1971, Ser. No. 195,368
Claims priority, application Great Britain, Nov. 3, 1970, 52,270/70
Int. Cl. A61k 21/00
U.S. Cl. 424—122     7 Claims

ABSTRACT OF THE DISCLOSURE

The present invention provides a new antibiotic, partricin, which is formed by the culturing of a new strain of Streptomyces aureofaciens. The new antibiotic exhibits a powerful anti-fungal and anti-protozoal activity.

BACKGROUND OF THE INVENTION

Figure 1:
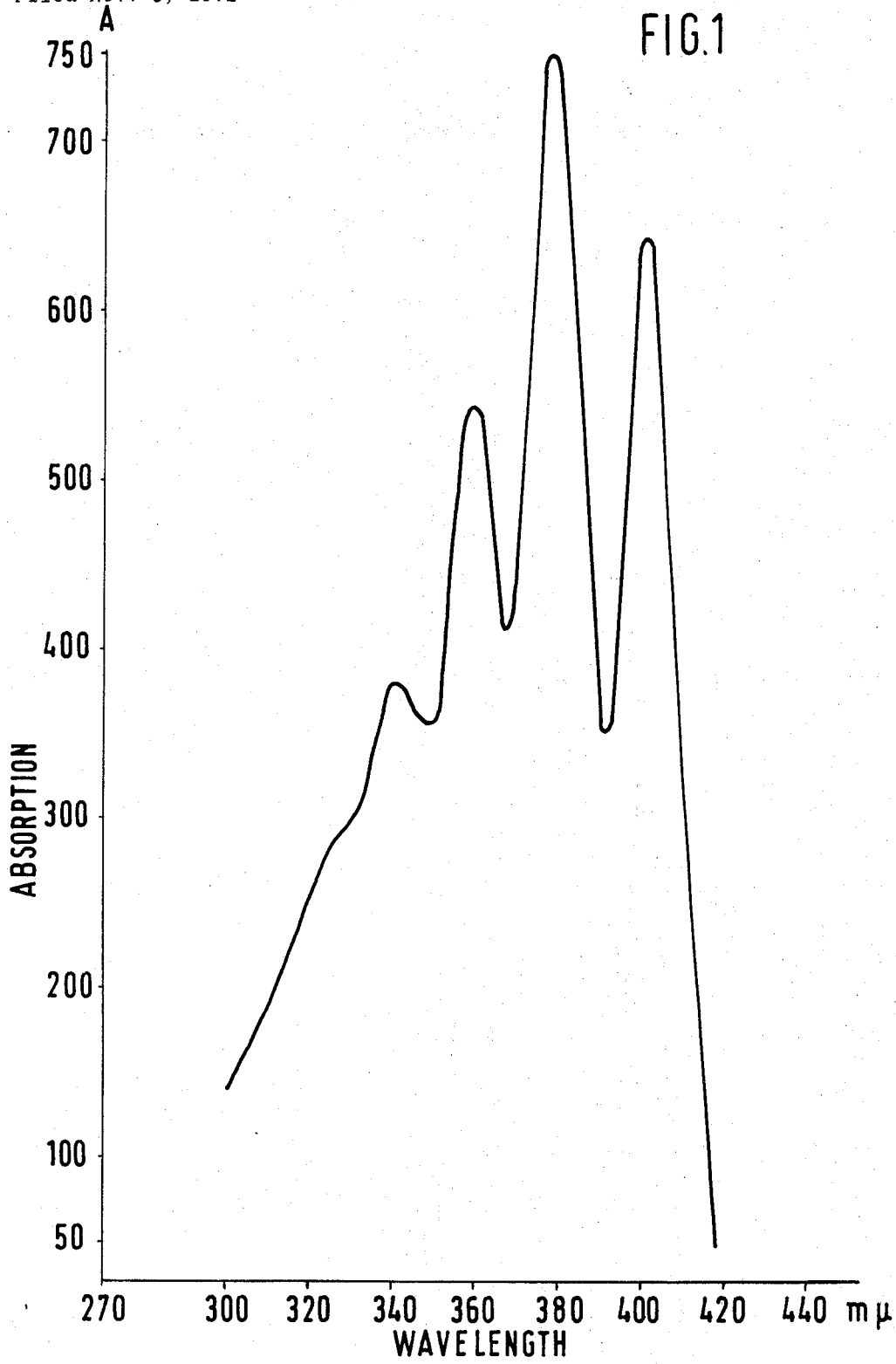

There is an ever increasing need for new and active materials which are effective against micro-organisms, such as fungi and protozoa, and which are more effective than and/or less toxic than hitherto known materials.

It is, therefore, an object of the present invention, to provide a new and effective antibiotic which is highly effective against fungi and protozoa.

SUMMARY OF THE INVENTION

The present invention is concerned with a new and useful antibiotic substance with a powerful anti-fungal and anti-protozoal activity and also with a certain degree of antihelminthic activity. It is believed that this new antibiotic substance may also have an activity against fungal and protozoal diseases of plants and that it could have an anti-cancerogenic activity.

The exact chemical structure of the new antibiotic has not yet been elucidated but we refer to it by our code number SPA-S-132 and propose for it the USAN approved name partricin.

This new antibiotic is of practical use in many pathological manifestations affecting plants and animals, including humans, caused by microorganisms, such as fungi and protozoa, against which known chemotherapeutic agents and antibiotics have little or no effect or are effective but can only be used with considerable precautions due to their high toxicity.

Partricin, the biological properties of which will be described in detail hereinafter, exerts a marked anti-fungal activity, especially against various pathogenic strains of Candida albicans, and an equally marked anti-protozoal activity, especially against Trichomonas vaginalis.

Partricin can be produced by growing a particular strain of Streptomyces aureofaciens at a temperature from 23° C. to 30° C., preferably of about 25° C., under submerged aerobic conditions, in an aqueous nutrient medium (broth) containing an assimilable, fermentable carbohydrate source and an assimilable nitrogen source. Examples of carbohydrate sources include sucrose, glucose, molasses, starch, dextrin, maize meal and the like and examples of nitrogen sources include yeast, corn steep liquor, soya bean meal, groundnut flour, ammonium sulphate, ammonium chloride, nitrates, urea and other conventional substances; the nutrient medium also contains mineral salts and calcium carbonate as a buffer.

DETAILED DESCRIPTION OF THE INVENTION

The fermentation is carried out for about 24 to 168 hours and, at the end of the most convenient period of time, a substantial amount of partricin is formed; at the same time, a substantial amount of tetracycline and/or chlortetracycline is formed.

The micro-organism useful for the preparation of partricin is a recently discovered species of Streptomyces, isolated from a specimen of undergrowth earth collected in central Italy. A culture of this strain of Streptomyces has been deposited in the public collection of micro-organisms of the U.S. Department of Agriculture, Agricultural Research Service, Northern Utilization Research and Development Division, 1815 N. University St., Peoria, Ill., U.S.A., and has been assigned the number NRRL 3878.

Its morphological characteristics have led to it being taxonomically grouped with Streptomyces aureofaciens.

It is, of course, to be understood that the present invention is not limited to the use of the particular organism described herein but includes, inter alia, mutants obtained from the described organism by the action of mutagen agents, such as X-rays, ultra-violet radiations and nitrogen mustards.

For isolating and characterising the above micro-organism, a portion of the soil sample is shaken in sterile distilled water, and plated on modified Bennet medium; this medium contains:

| | G. |
|---|---|
| Yeast extract | 1 |
| Meat extract | 1 |
| Bacto Casitone | 2 |
| Glucose | 12 |
| Agar | 20 |

Distilled water to 1000 ml.

The medium has a pH of 7.0 and is sterilised before use for 30 minutes at 1 at. pressure.

After 10–15 days of incubation at 25 °C., colonies of our strain of Streptomyces aureofaciens are isolated from the plated soil. The isolated colonies are grown on a modified Bennet medium, the composition of which is as follows:

| | G. |
|---|---|
| Yeast extract | 1 |
| Meat extract | 1 |
| Bacto Casitone | 2 |
| Glucose | 12 |
| Agar | 20 |

Distilled water to 1000 ml.

This medium has a pH of 7.0 and is sterilised before use for 30 minutes at 1 at. pressure.

The cultures of our micro-organism have the following morphological characteristics:

Organic medium (Bennet).—Vegetative growth: Good growth with yellow to golden yellow edges changing to brown yellow with ageing. Soluble pigment in the medium: Golden yellow colour changing to brown yellow. Aereal mycelium with stains: White to yellowish colour. Sporification: From grey to dark grey colour.

Synthetic medium (Asparagine).—Vegetative growth: Colourless to whitish yellow colour changing to green grey with ageing. Light soluble pigment: Golden yellow in the medium. White aereal mycelium sporification from pink grey to dark grey.

The main biochemical property of our strain of Streptomyces aureofaciens, or of its mutants useful for the purpose of the present invention, is that, during fermentation, not only is a substantial amount of partricin produced but also a substantial amount of tetracycline and/or of chlortetracycline.

At the end of the fermentation, the tetracycline-type antibiotic is extracted by acidifying the medium and filtering the aqueous phase which contains practically all the tetracycline-type antibiotic. At this stage, it is possible to extract the partricin from the mycelium by means of an appropriate solvent in which the antibiotic is soluble.

After precipitation from the recovery solvent and subsequent filtration, partricin is obtained in a crystalline form, the analysis by weight of which is:

| | Percent |
|---|---|
| C | 62.8 |
| N | 3.2 |
| H | 7.9 |
| O | 25.2 |

Partricin is a yellow to dark yellow, microcrystalline substance which is practically insoluble in water and in common organic solvents but is soluble in dimethyl formamide, dimethyl sulphoxide and dimethyl acetamide. Partricin is also soluble in pyridine and in other basic solvents. It is also characterised by the following physico-chemical properties:

This layer chromatography.—Carrying out the chromatography on silica gel strips using a mixture of butanol-ethanol-acetone-25% ammonium hydroxide (2:5:1:3) as eluent, gives Rf values of about 0.50. The spots are identified by exposure to ultra-violet light.

Ultra-violet spectrum (see accompanying FIG. 1).—A solution of partricin in ethanol at the concentration of about 0.01 mg./ml. shows maximum absorbance of ultra-violet light at the wavelengths of 401, 379, 359 and 341 m$\mu$. Minimum values are at 391, 368 and 349 m$\mu$. When the diluted solution is left exposed to light, the whole spectrum is observed to shift to wavelengths about 4 m. higher, thus modifying the intensity of the absorption peaks.

Figure 2:
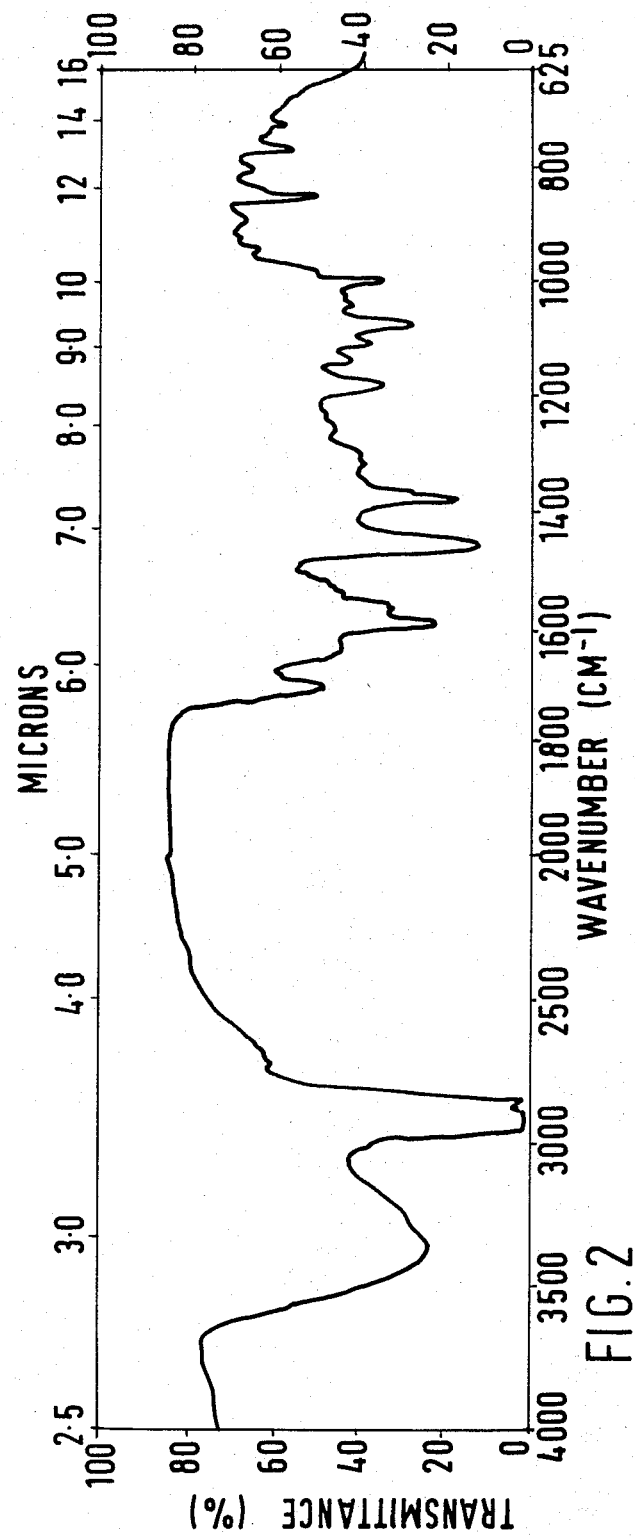

Infra-red spectrum (see accompanying FIG. 2).—The infra-red absorption spectrum of partricin suspended in Vaseline oil, has absorption maxima at frequencies of 3355, 1704, 1596, 1175, 1070, 995 and 850 cm.$^{-1}$. Other peaks are not sufficiently resolved, such as those around 1630, 1570 and 1530 cm.$^{-1}$. The peaks at 1135, 1105, 1040, 890, 800 and 765 cm.$^{-1}$ are weaker and, therefore, less characteristic and distinctive.

The characteristic of the above ultra-violet spectrum indicates that partricin is an antibiotic with a polyenic structure and, more precisely, with a heptaenic structure. The characteristics of the infra-red spectrum confirm the polyenic structure of the substance. Light induced modification of UV spectrum should indicate that partricin is not originally found in the "all-trans" form, but there is probably one or more "cis" double bonds which, similar to other known heptaenes, easily undergo a light stereo-isomerisation to the "trans" form. Similar to what is reported in literature for other polyenic antibiotics, it should consist of a lactonic macrocyclic nucleus and possess, among the various substituents, some hydroxyl radicals; a carboxy and an amino group are also identifiable, which give the product the properties of an amphoteric substance.

The polyenes with antibiotic activity constitute a large category of compounds which are normally produced by the metabolism of numerous micro-organisms, including *Streptomyces aureofaciens*.

Due to their highly unsaturated structure, with conjugated double bonds, demonstrated by their characteristic ultra-violet absorbance spectrum, they are divided into tetraenes, pentanenes, hexaenes and heptaenes. Biologically, these compounds are especially interesting due to their high activity against fungi and yeasts; despite their low or non-existent antibacterial activity, they are extensively used in the treatment of mycoses.

Recently, some of these polyenic antibiotics have been studied for their marked cytotoxic activity against cancerogenous cells. The fact that sensitive microorganisms (fungi or protozoa) do not readily form strains which are resistant to these polyenic antibiotics and that effective cures for these fungal infections or protozoal infestations have not been found amongst the sulphonamides, penicillins and tetracyclines, has enhanced the interest in these polyenic antibiotics.

As previously mentioned, the antibiotic partricin is obtained by the submerged fermentation of a strain of *Streptomyces aureofaciens* (NRRL 3878) in a suitable fermentation broth. The tetracycline-type antibiotics, produced at the same time, are first extracted by acidifying the broth and filtering the mycelium. In a typical procedure, the moist mycelium, containing diatomaceous earth or other filter aid, is suspended in butanol (about 100–400 litres per 100 kg. of mycelium). The suspension is adjusted, with stirring, to pH 9.2–10.2 by adding ammonium hydroxide or other appropriate alkali. The mycelium is then removed by filtration and the butanol solution of partricin is washed twice with a 5% solution of ethylene-diamine-tetraacetic acid, previously adjusted to pH 9.8 with ammonium hydroxide.

After separating the aqueous phase, the butanol is concentrated to a small volume (1/20–1/25 of initial volume) at reduced pressure and at temperature no higher than 40° C.–45° C. Partricin crystallises out after cooling the solution.

Regardless of the ferementation conditions, the product may contain some impurities; in this case, washing by digestion with various solvents, such as methyl isobutyl ketone, acetone or methanol, is necessary. A more intensive purification can be obtained by dissolving in appropriate solvents, filtering through activated charcoal and subsequently precipitating with ligroin, toluene or some other solvent in which the product is not soluble. Alternatively, the product can be purified by suspending it in acidified water, which removes all the impurities soluble therein. Very good results are obtained with column chromatography on silica gel using more or less complex mixtures of solvents as eluent, for example a mixture of butanol - ethanol - acetone-concentrated ammonium hydroxide in the ratio 2:5:1:3; this chromatographic technique permits the isolation of a quite pure substance.

The product obtained by one of the described methods has the above-mentioned physico-chemical properties.

From a biological point of view, partricin has little or no anti-bacterial activity but it is very active against numerous types of fungi, yeasts and protozoa (see following Table 1). This activity is particularly high against *Candida albicans* (minimum inhibiting concentration= 0.31–0.62 mcg./ml.) as can be seen from following Table 2, where the anti-fungal activity is compared with that of two of the best known antimycotics of similar structure, i.e. nystatin (Mycostatin) and amphotericin B (Fungizone). Its antimycotic activity has been tested on different strains of fungi, determining the minimum inhibiting concentrations in agar or broth.

Just as remarkable in its activity against some strains of *Trichomonas vaginalis*, against which it is active even at concentrations as low as 0.15–0.20 mcg./ml.

The acute toxicity ($LD_{50}$) of partricin was determined on mice: it was about 0.5 mg./kg. by the intraperitoneal route, while the $LD_{50}$ determined by oral administration was about 300 mg./kg.; in rats, the $LD_{50}$ by the same route, gave a value approaching 300 mg./kg.

Pharmacological studies have shown it to be well tolerated by normal skin. The studies were carried out on guinea pigs, applying 1 mg. of partricin to an area (10 sq. cm.) of their skin, up to complete absorption. This treatment lasted 10 days.

The local and general tolerance of vaginal suppositories containing partricin was studied in two female mongrel dogs weighing about 6 kg. One suppository a day was administered by the vaginal route for 6 days a week for a month (5 mg. of partricin/vaginal suppository) followed by another month's treatment with higher dosed vaginal suppositories (25 mg. of partricin/vaginal suppository). The vaginal mucosa was examined before every treatment and the animals were observed daily to detect possible signs of side effects or behaviour anomalies.

Their weight was checked every 7 days and tests on blood, urine, renal and liver functions were carried out at fixed times, before and during treatment, the following parameters being taken into consideration:

(a) Haematological examination.—Red cells, white cells, leukocyte count, haematocrit, haemaglobin, blood clotting time.

(b) Haematochemical examination.—Blood sugar, transaminases (GOT and GPT), alkaline phosphatase.

(c) Liver function.—B.S.P. test and MacLagan test.

(d) Kidney function.—Blood urea nitrogen and blood creatinine.

(e) Urinalysis.—pH, specific gravity, albumen, glucose, acetone bodies, blood, bilirubin, urea.

After two months of treatment, the two dogs were anaesthetised with Nembutal and bled to death. Post-mortem examinations were carried out on the main organs and fragments were histologically studied.

Results.—No particular signs of side effects were observed either during the treatment with 5 mg./vaginal suppository or during that with 25 mg./vaginal suppository of partricin.

Both dogs showed normal behaviour and normal weight variations (see following Table 3). The haematological and haematochemical studies, as well as the tests on liver and kidney function and the urinalysis, always gave values within normal limits (see following Tables 4–8). Traces of blood were found in the urine. The autopsy revealed no significant alterations in the organs examined (lung, heart, liver, spleen, kidneys, adrenals, vagina, etc.).

TABLE 1

| Strain: | Partricin minimum inhibiting concentration in mcg./ml. |
|---|---|
| Bacillus subtilis | 100 |
| Escherichia coli | 1000 |
| Salmonella paratyphi A | 1000 |
| Ewinia sp. | 10 |
| Tetrahymena pyriformis | 100 |
| Turbatrix aceti | 1000 |
| Trichophyton mentagrophytes | 100 |
| Candida albicans | 1 |
| Fusarium sp. | 1000 |
| Verticillium albo atrum | 10 |
| Chlorella vulgaris | 10 |
| Clover seed | 1000 |
| Trichomonas vaginalis | 1 |

TABLE 2

| Strain | Minimum inhibiting concentration in mcg./ml. | | |
|---|---|---|---|
| | Partricin | Amphotericin B | Nystatin |
| Mucor sp. | 1.25 | 5.0 | |
| Absidia sp. | 5.0 | 0.62 | |
| Alternaria sp. | 10 | 1.25 | |
| Aspergillus niger | 2.5 | 0.62 | |
| Penicillium notatum | 1.2–2.5 | 40 | |
| Trich. mentagrophyt. | 40 | 2.5 | |
| Trich. radians | >40 | 2.5 | |
| Trich. rubrum | 5 | 0.62 | |
| Epiderm. floccosum | 2.5 | 0.15 | |
| Microsporum gypseum | >40 | 2.5 | |
| Sacch. cerevisiae | 0.62–1.25 | 0.62 | 2.5 |
| C. albicans 73 | 0.62 | 0.31 | 5 |
| C. albicans 74 | 0.62 | 0.62 | 5 |
| C. albicans 183 | 0.62 | 0.31 | 5 |
| C. albicans 184 | 0.31 | 0.31 | 5 |
| C. albicans 185 | 0.62 | 0.31 | 5 |
| C. albicans 186 | 0.31 | 0.31 | 5 |
| C. albicans 187 | 0.31 | 0.31 | 2.5 |
| C. albicans 188 | 0.31 | 0.31 | 5 |
| C. albicans 189 | 0.31 | 0.31 | 2.5 |
| C. albicans 190 | 0.31 | 0.15 | 2.5 |
| C. krusei 191 | 0.62 | 0.62 | 5 |
| C. tropicalis 192 | 0.62 | 0.31 | 5 |

TABLE 3

Treatment of dogs with partricin vaginal suppositories, weight, kg.

| | Number of days | Dog No. 38 F. | Dog No. 39 F. |
|---|---|---|---|
| Untreated | −30 | 5.7 | 6.9 |
| | −15 | 5.8 | 6.3 |
| | −7 | 5.9 | 6.3 |
| | 0 | 5.9 | 6.6 |
| Treated with partricin: | | | |
| 5 mg. per vaginal suppository | +7 | 6.0 | 6.8 |
| | +14 | 5.8 | 6.7 |
| | +21 | 6.0 | 7.0 |
| | +28 | 6.0 | 6.8 |
| | +35 | 6.3 | 7.3 |
| | +42 | 6.5 | 7.2 |
| 25 mg. per vaginal suppository | +49 | 6.9 | 7.5 |
| | +56 | 6.5 | 7.5 |
| | +60 | 6.3 | 7.5 |

NOTES:
−=Before treatments
+=After treatments

TABLE 4.—TREATMENT OF DOGS WITH PATRICIN VAGINAL SUPPOSITORIES

Haematological Examination

| Dog number | Day analysis made | Red cells (×10⁶) | White cells (×10³) | Leukocyte count, percent | | | | | Hematocrit, percent | Hb, percent | Blood clotting time (minutes) |
|---|---|---|---|---|---|---|---|---|---|---|---|
| | | | | N | E | B | L | M | | | |
| 38 F | −30 | 5.68 | 7.2 | 68 | 2 | | 26 | 4 | 48 | 12.8 | 3.5 |
| | −15 | 5.94 | 8.6 | 67 | 2 | | 27 | 4 | 45 | 14.3 | 3.0 |
| | −7 | 5.58 | 8.6 | 72 | 3 | | 22 | 3 | 43 | 13.5 | 2.0 |
| | +10 | 5.56 | 10.6 | 77 | 1 | | 19 | 3 | 46 | 12.5 | 2.5 |
| | +20 | 7.30 | 10.3 | 68 | 1 | | 26 | 5 | 42 | 13.1 | 3.0 |
| | +30 | 7.92 | 10.1 | 72 | 2 | | 21 | 5 | 50 | 13.6 | 3.0 |
| | +40 | 7.44 | 9.4 | 70 | 2 | | 26 | 2 | 50 | 13.5 | 4.5 |
| | +50 | 7.64 | 8.6 | 71 | 4 | | 21 | 4 | 51 | 14.0 | 3.5 |
| | +60 | 8.68 | 9.2 | 74 | 7 | | 17 | 2 | 48 | 13.5 | 3.0 |
| 39 F | −30 | 5.80 | 6.1 | 68 | 1 | | 27 | 4 | 48 | 13.6 | 2.0 |
| | −15 | 5.62 | 11.0 | 85 | | | 11 | 4 | 42 | 11.6 | 3.5 |
| | −7 | 5.21 | 11.9 | 87 | | | 10 | 3 | 36 | 10.6 | 3.0 |
| | +10 | 6.16 | 6.8 | 81 | 3 | | 13 | 3 | 38 | 11.0 | 3.5 |
| | +20 | 6.18 | 7.2 | 72 | 8 | 2 | 16 | 2 | 40 | 11.5 | 3.0 |
| | +30 | 6.76 | 7.2 | 61 | 19 | | 18 | 2 | 45 | 12.8 | 2.5 |
| | +40 | 6.20 | 7.8 | 68 | 12 | | 18 | 2 | 45 | 12.5 | 2.5 |
| | +50 | 7.12 | 5.2 | 56 | 7 | | 35 | 2 | 46 | 12.5 | 3.0 |
| | +60 | 6.88 | 7.6 | 59 | 5 | | 33 | 3 | 45 | 12.5 | 2.0 |

NOTES:
−=Before treatment.
+=After treatment.

TABLE 5.—TREATMENT OF DOGS WITH PARTRICIN VAGINAL SUPPOSITORIES

Haematochemical Examination

| Dog number | Day analysis made | Blood sugar, mg. percent | Alkaline phosphatase, mU/ml. | SGOT, mU/ml. | SGPT, mU/ml. |
|---|---|---|---|---|---|
| 38 F | −30 | 73 | 32 | 10 | 10 |
|  | −15 | 63 | 38 | 13 | 6 |
|  | −7 | 80 | 36 | 19 | 7 |
|  | +10 | 77 | 52 | 13 | 4 |
|  | +20 | 79 | 38 | 11 | 3 |
|  | +30 | 79 | 36 | 18 | 10 |
|  | +40 | 71 | 78 | 9 | 4 |
|  | +50 | 72 | 62 | 18 | 8 |
|  | +60 | 70 | 61 | 12 | 5 |
| 39 F | −30 | 73 | 15 | 19 | 12 |
|  | −15 | 88 | 31 | 18 | 5 |
|  | −7 | 89 | 26 | 20 | 3 |
|  | +10 | 77 | 20 | 14 | 5 |
|  | +20 | 80 | 16 | 14 | 4 |
|  | +30 | 84 | 14 | 13 | 6 |
|  | +40 | 87 | 14 | 10 | 4 |
|  | +50 | 67 | 29 | 17 | 6 |
|  | +60 | 68 | 31 | 11 | 7 |

NOTES:
−=Before treatment.
+=After treatment.

TABLE 7.—TREATMENT OF DOGS WITH PARTRICIN VAGINAL SUPPOSITORIES

Liver Function

| Dog number | Day analysis made | B.S.P., percent | MacLagan test |
|---|---|---|---|
| 38 F | −30 | 5 | 0.25 |
|  | −15 | 6 | 0.25 |
|  | −7 | 5 | 0.25 |
|  | +10 | 3 | 0.25 |
|  | +20 | 3 | 0.40 |
|  | +30 | 3 | 0.75 |
|  | +40 | 3 | 0.75 |
|  | +50 | 4 | 0.75 |
|  | +60 | 4 | 0.25 |
| 39 F | −30 | 5 | 0.52 |
|  | −15 | 5 | 0.50 |
|  | −7 | 4 | 0.48 |
|  | +10 | 7 | 0.75 |
|  | +20 | 3 | 0.60 |
|  | +30 | 3 | 0.70 |
|  | +40 | 6 | 0.76 |
|  | +50 | 4 | 0.70 |
|  | +60 | 5 | 0.25 |

NOTES:
−=Before treatment.
+=After treatment.

TABLE 8.—TREATMENT OF DOGS WITH PARTRICIN VAGINAL SUPPOSITORIES

Urinalysis

| Dog number | Day analysis made | Colour | Volume in 24 hrs. | Specific gravity | pH | Albumin | Glucose | Acetone bodies | Blood | Bilirubin | Urea, g./day |
|---|---|---|---|---|---|---|---|---|---|---|---|
| 38 F | [1] 30 | Yellow | 68 | 1.050 | 6.0 | + | − | − | − | − | 4.7 |
|  | [1] 15 | do | 73 | 1.040 | 7.0 | + | − | − | − | − | 3.7 |
|  | [1] 7 | do | 59 | 1.040 | 7.0 | + | − | − | − | + | 3.4 |
|  | [2] 10 | do | 85 | 1.050 | 8.0 | ++ | − | − | ++ | − | 6.8 |
|  | [2] 20 | do | 60 | 1.055 | 7.5 | + | − | − | ++ | − | 5.3 |
|  | [2] 30 | do | 50 | 1.061 | 8.0 | + | − | − | + | − | 4.5 |
|  | [2] 40 | do | 130 | 1.050 | 6.0 | + | − | − | − | − | 9.0 |
|  | [2] 50 | do | 110 | 1.056 | 6.5 | + | − | − | ++ | − | 8.6 |
|  | [2] 60 | do | 130 | 1.042 | 6.0 | + | − | − | + | − | 5.8 |
| 39 F | [1] 30 | Brown | 50 | 1.060 | 6.0 | + | − | − | ++ | − | 4.7 |
|  | [1] 15 | Yellow-brown | 40 | 1.054 | 6.0 | ++ | − | − | ++ | − | 2.7 |
|  | [1] 7 | Brown | 48 | 1.050 | 6.0 | + | − | − | ++ | − | 2.9 |
|  | [2] 10 | Dark yellow | 45 | 1.060 | 8.5 | + | − | − | ++ | − | 4.2 |
|  | [2] 20 | Yellow | 70 | 1.057 | 6.0 | + | − | − | ++ | − | 6.6 |
|  | [2] 30 | do | 100 | 1.055 | 7.0 | ++ | − | − | + | − | 7.1 |
|  | [2] 40 | do | 70 | 1.060 | 6.0 | + | − | − | ++ | − | 5.5 |
|  | [2] 50 | do | 100 | 1.050 | 6.5 | + | − | − | ++ | − | 5.0 |
|  | [2] 60 | do | 75 | 1.040 | 6.0 | + | − | − | + | − | 4.6 |

NOTES:
−=Absent.
+=Slight traces.
++=Moderate traces.
+++=Marked traces.
[1] Before treatment.
[2] After treatment.

TABLE 6.—TREATMENT OF DOGS WITH PARTRICIN VAGINAL SUPPOSITORIES

Kidney Function

| Dog number | Day analysis made | Blood urea nitrogen, mg., percent | Blood creatinine, mg., percent |
|---|---|---|---|
| 38 F | −30 | 24 | 1.6 |
|  | −15 | 22 | 1.6 |
|  | −7 | 18 | 1.5 |
|  | +10 | 16 | 1.6 |
|  | +20 | 20 | 1.1 |
|  | +30 | 26 | 1.0 |
|  | +40 | 28 | 1.1 |
|  | +50 | 28 | 0.8 |
|  | +60 | 18 | 0.8 |
| 39 F | −30 | 18 | 1.4 |
|  | −15 | 14 | 1.4 |
|  | −7 | 12 | 1.4 |
|  | +10 | 17 | 1.6 |
|  | +20 | 17 | 1.1 |
|  | +30 | 20 | 0.7 |
|  | +40 | 22 | 1.1 |
|  | +50 | 22 | 0.8 |
|  | +60 | 19 | 0.8 |

NOTES:
−=Beforetreatment.
+=After treatment.

Therefore, in view of its microbiological, pharmacological and toxicological characteristics, partricin has a marked therapeutic interest for combatting many diseases caused by fungi and protozoa in humans and animals and by fungi and protozoa in plants. Particularly interesting is its administration by topical application in the form of tincture, ointment, liniment or cream for dermatological use and in inserts or suppositories (effervescent or normal) for vaginal use in mycosis or in infestations by *Trichomonas vaginalis*, *T. hominis* and the like; for plants, the substance can be sprayed directly onto the leaves, stalks or roots, or mixed with fertilisers or added to the irrigation water.

The observation of a low absorption of the antibiotic through the intestinal wall and the high activity against *Candida albicans*, make it particularly suitable for orally combatting inestinal infections, i.e. infections which frequently occur in humans, especially following long-term antibiotic treatment with tetracyclines or chloramphenicol and the like which deplete the beneficial symbiotic intestinal flora.

It can also be advantageous to associate partricin with one or more the above-mentioned wide spectrum antibiotics in order to prevent fungal infections arising in the intestinal tract after the usual oral administration.

The following examples are given for the purpose of illustrating the present invention:

EXAMPLE 1

1 kg. of mycelium, obtained by the submerged aerobic fermentation of a strain of *Streptomyces aureofaciens* at about 25° C., is isolated after acidification to pH 1.8–2 and subsequent filtration. The moist mycelium, preferably containing diatomaceous earth or other suitable filter aid, is suspended in 3 litres of n-butanol and the mixture is brought to pH 9.5–10 by the addition of ammonium hydroxide. The butanol is separated by filtration and washed with 1.5 litres of water at pH 1.5. The aqueous phase is removed and the butanol phase is concentrated under vacuum to about 150 ml. Rapid cooling precipitates the partricin which is washed with butanol and then with petroleum ether.

The product thus obtained inhibits the growth of a strain of *Saccharomyces cerevisiae* at a dilution of 1.25–2.5 mcg./ml.

EXAMPLE 2

10 kg. of mycelium obtained as described in Example 1 are extracted with 40 litres of butanol, after having brought the pH to 9.8 by adding ammonium hydroxide. After stirring for about 90 minutes, the mycelium is filtered off. The butanol is then extracted twice with 10 litres of 5% ethylene-diamine-tetraacetic acid brought to pH 9.8 with ammonium hydroxide. The organic phase is then separated and concentrated under vacuum to 2 litres.

Partricin quickly precipitates in a crystalline state. It is filtered off and washed with butanol, acetone and ether. The product is dried under vacuum. It inhibits the growth of a strain of *Saccharomyces cerevisiae* at a dilution of about 1.25 mcg./ml.

EXAMPLE 3

10 kg. of mycelium are obtained as described in Example 1 and the moist product is extracted with 40 litres of acetone at pH 9.8. Partricin precipitates in a crude state, bringing the pH of the acetonic solution to 2. The dried product is suspended in water at pH 2.5 and the undissolved partricin is separated by filtration. It is washed with acidified water and dried over phosphorus pentoxide. The product is then taken up again with methanol and ethyl acetate (1:1). The undissolved partricin is separated by filtration and washed with ether. The product thus obtained inhibits the growth of a strain of *Saccharomyces cerevisiae* at a dilution of 0.62–1.25 mcg./ml.

EXAMPLE 4

600 g. of mycelium obtained as described in Example 1 are suspended in 4800 litres of water at pH 11. After stirring for 1 hour, the suspension is filtered, the filtrate adjusted to pH 5 and again filtered after one hour. The product is washed with acetone and dried under a vacuum. The antibiotic product obtained inhibits the growth of a strain of *Saccharomyces cerevisiae* at the dilution of 5 mcg./ml.

EXAMPLE 5

6 g. of the product obtained as described in Example 2 are slurried in 30 ml. of dimethyl sulphoxide. 0.5 g. of activated charcoal are added and then filtration is carried out. The filter is carefully washed with another 20 ml. of dimethyl sulphoxide.

To the solution obtained are added 50 ml. of formamide and, with vigorous stirring, 750 ml. of ethyl acetate. Stirring is continued for 1 hour and then the partricin is precipitated in a crystalline state and filtered off under a vacuum. The product is washed several times with 100 ml. portions of ethyl acetate and then with 100 ml. of diethyl ether. The product is dried in a vacuum. It inhibits the growth of a strain of *Saccharomyces cerevisiae* at a dilution of 0.62/1.25 mcg./ml.

EXAMPLE 6

30 g. of the product obtained as described in Example 5 are suspended in about 2 litres of 50% aqueous acetone. The pH of the suspension is brought to 11 by carefully adding triethylamine, with stirring. To the solution of partricin thus obtained are added 5 g. of activated charcoal. The solid phase is removed by filtration under a vacuum. The pH of the aqueous acetone solution thus obtained is adjusted to 5 by adding concentrated hydrochloric acid. Partricin precipitates in a crystalline state and is collected by filtration and washed with acetone and then with ethyl ether. It is then filtered off and dried under a vacuum.

The product thus obtained inhibits the growth of a strain of *Saccharomyces cerevisiae* at a dilution of 0.62 mcg./ml.

EXAMPLE 7

4 g. of partricin obtained as described in Example 2 are dissolved in 20 ml. dimethyl sulphoxide and the solution filtered with 200 mg. of activated charcoal, the charcoal being washed with 5 ml. of dimethyl sulphoxide. The solutions of dimethyl sulphoxide are combined and 30 ml. of formamide added. Partricin precipitates upon adding 150 ml. of methyl ethyl ketone. The precipitate is filtered off and washed with acetone and ether. The product is dried under a vacuum. It inhibits the growth of a strain of *Saccharomyces cerevisiae* at a dilution of 0.62–1.25 mcg./ml.

EXAMPLE 8

10 g. of partricin obtained as described in Example 3 are dissolved in 80 ml. of dimethyl sulphoxide and filtered, after adding 2 g. of activated charcoal.

Partricin precipitates in a crystalline state upon adding an equal volume of water. The precipitate is filtered off, then taken up with water and thereafter washed with acetone and ether.

The product thus obtained inhibits the growth of a strain of *Saccharomyces cerevisiae* at a dilution of about 0.62 mcg./ml.

EXAMPLE 9

50 g. of partricin obtained as in Example 2 are treated, while stirring, for 1 hour with 2 litres of methanol, then filtered and washed with methanol and with ether and then dried under a vacuum. A product is obtained with a minimum inhibiting concentration of 0.62–1.25 mcg./ml.

EXAMPLE 10

11 g. of partricin obtained as described in Example 5 are treated with a mixture of water and butanol (1:1), bringing the pH to 10 with ammonium hydroxide. The aqueous phase is removed and the butanol phase is concentrated to a small volume under a vacuum. The product is filtered off, washed with butanol and ether and then dried under a vacuum to yield a substance with a minimum inhibiting concentration of 0.62 mcg./ml.

EXAMPLE 11

10 g. of partricin obtained as described in Example 9 are treated with water and butanol at pH 10. After stirring for 30 minutes, the aqueous phase is removed while the butanol phase is concentrated to a small volume. It is then filtered, washed with ether and dried under a vacuum to yield a product with a minimum inhibiting concentration of about 0.62 mcg./ml.

EXAMPLE 12

10 g. of partricin obtained as described in Example 6, are dissolved in 80 ml. of a mixture consisting of butanol-ethanol-acetone-concentrated ammonium hydroxide (2:5:1:3) and any insoluble matter is filtered off. The solution obtained is percolated through a chromatographic column prepared from 250 g. silica gel (0.05–0.20 mm.), using the above solvent mixture when filling up the column and in the subsequent elution.

After discarding the first runnings of colourless solvent, 200 ml. fractions of eluate are collected and pooled after having been tested separately for purity by means of thin layer chromatography (Kieselgel $F_{254}$ plate, solvent system as above).

The solution containing the pure product is concentrated to a small volume under vacuum and at ambient temperautre and then the solute is precipitated by adding excess ether and collected by filtration. The product is then washed with water, adjusting the pH of the suspension to about 3.5 by carefully adding diluted hydrochloric acid, filtered and washed again by covering with acetone. Almost pure partricin is obtained in the form of a yellow powder.

The present invention also includes within its scope pharmaceutical compositions containing partricin. These pharmaceutical compositions can be administered orally or parenterally in admixture with a solid or liquid pharmaceutical carrier.

Solid compositions for oral administration include compressed tablets, pills, dispersible powders and granules. In such solid compositions, partricin is admixed with at least one inert diluent, such as calcium carbonate, starch, alginic acid or lactose. The compositions may also comprise, as in normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavoring agents.

The compositions according to the present invention, for oral administration, include capsules of absorbable material, such as gelatine, containing partricin, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active ingredient in the compositions of the present invention may be varied, it being necessary that it should constitute a proportion such that a suitable dosage for the desired therapeutic effect shall be obtained.

Examples of pharmaceutical compositions containing partricin include the following:

EXAMPLE 13

Ointment

| Composition: | G. |
|---|---|
| Partricin | 0.5 |
| Alcoholic fats | 60 |
| Lanolin | 15 |
| Polyethylene glycol 1540 monostearate ad 100 g. | |

EXAMPLE 14

Liniment

| Composition: | G. |
|---|---|
| Partricin | 0.5 |
| Dimethylacetamide | 5 |
| Anhydrous lanolin | 15 |
| Cetyl alcohol | 30 |
| Oleyl alcohol | 15 |
| Sorbitan trioletate | 10 |
| Polyethylene glycol 1540 monostearate | 24 |

EXAMPLE 15

Vaginal suppositories

Each vaginal suppository contains:

| | |
|---|---|
| Partricin, mg. | 5 |
| Dimethyl acetamide, mg. | 50 |
| Polyethylene glycol 1540 monostearate, g. | 1.35 |
| Cetyl alcohol, g. | 0.500 |

EXAMPLE 16

Vaginal suppositories

Each vaginal suppository contains:

| | |
|---|---|
| Partricin, mg. | 25 |
| Dimethyl acetamide, mg. | 50 |
| Polyethylene glycol 1540 monostearate, g. | 1.35 |
| Cetyl alcohol, g. | .500 |

The pharmaceutical compositions illustrated in Examples 13–16 above show valuable anti-fungal and antiprotozoal activity when administered to humans.

We claim:

1. The amphoteric antibiotic partricin which has an $Rf$ value of about 0.50 on silica gel using butanol-ethanol-acetone-25% ammonium hydroxide (2:5:1:3) as eluent, shows ultra-violet absorption maxima in ethanolic solution at 0.01 mg./ml. concentration at 401, 379, 359 and 341 m$\mu$, shows infrared absorption maxima (Nujol) at 3355, 1704, 1596, 1175, 1070, 995 and 850 cm.$^{-1}$, has the following elemental analysis: C=62.8%, H=7.9%, N=3.2% and O=25.2%, and is a yellow to dark yellow microcrystalline substance which is practically insoluble in water.

2. Process for the preparation of partricin, wherein *Streptomyces aureofaciens* (NRRL 3878) is cultured, under submerged aerobic conditions, in an aqueous nutrient medium containing an assimilable, fermentable carbohydrate source and an assimilable nitrogen source for a time sufficient to produce an antifungal or antiprotozal amount of partricin in said media, whereafter the medium is acidified and the mycelia filtered off and partricin is extracted from the mycelia of the microorganism.

3. Process according to claim 2, wherein the culturing is carried out at a temperature of from 23 to 30° C.

4. Process according to claim 2, wherein the culturing is carried out at a temperature of about 25° C.

5. Process according to claim 2, wherein the mycelia obtained after the filtration step are adjusted to a pH of 9.2–10.2 prior to extraction of the partricin.

6. Process according to claim 2, wherein the partricin is purified by chromatography on silica gel.

7. Process for the preparation of partricin, wherein *Streptomyces aureofaciens* (NRRL 3878) is cultured, under submerged areobic conditions, at a temperature of about 25° C. in an aqueous nutrient medium containing an assimilable, fermentable carbohydrate source and an assimilable nitrogen source, for a time sufficient to produce antiprotozoal or antifungal amount of partricin in said medium, whereafter the medium is acidified and the mycelia filtered off and the pH thereof adjusted to 9.2–10.2, whereafter the partricin is extracted from the mycelia and purified by chromatography on silica gel.

References Cited

J. Am. A., 217(9):1233, Aug. 30, 1971.

JEROME D. GOLDBERG, Primary Examiner

U.S. Cl. X.R.

195—80